US006854484B2

(12) United States Patent
Geyer et al.

(10) Patent No.: US 6,854,484 B2
(45) Date of Patent: Feb. 15, 2005

(54) VALVE FOR A SLURRY OUTLET OPENING OF A CHEMICAL MECHANICAL POLISHING DEVICE AND CHEMICAL MECHANICAL POLISHING DEVICE HAVING A VALVE

(75) Inventors: Stefan Geyer, Dresden (DE); Andreas Fischer, Dresden (DE)

(73) Assignee: Infineon Technologies AG, Munich (DE)

( * ) Notice: Subject to any disclaimer, the term of this patent is extended or adjusted under 35 U.S.C. 154(b) by 11 days.

(21) Appl. No.: 10/210,014

(22) Filed: Jul. 31, 2002

(65) Prior Publication Data

US 2003/0024582 A1 Feb. 6, 2003

(30) Foreign Application Priority Data

Jul. 31, 2001 (DE) .......................................... 101 37 577

(51) Int. Cl.[7] ....................... F16K 15/14; H01L 21/304; B24B 57/02
(52) U.S. Cl. ....................... 137/844; 137/849; 451/101; 451/102; 451/446; 438/693
(58) Field of Search ................................. 137/843, 844, 137/846, 849, 845; 451/60, 99, 101, 102, 446; 251/331

(56) References Cited

U.S. PATENT DOCUMENTS

| | | | | | |
|---|---|---|---|---|---|
| RE682 | E | * | 4/1859 | Peale | 137/844 |
| 187,411 | A | * | 2/1877 | Painter | 137/850 |
| 2,674,318 | A | * | 4/1954 | Sutliff | 166/165 |
| 2,810,347 | A | * | 10/1957 | Rippingille | 417/383 |
| RE27,399 | E | * | 6/1972 | Urso | 137/512.15 |
| 4,593,716 | A | * | 6/1986 | Cesna | 137/561 A |
| 4,607,663 | A | * | 8/1986 | Raftis et al. | 137/846 |
| 4,718,826 | A | * | 1/1988 | Simmer | 417/234 |
| 4,945,688 | A | * | 8/1990 | Yie | 451/102 |
| 5,330,437 | A | * | 7/1994 | Durman | 604/167.04 |
| 5,769,125 | A | * | 6/1998 | Duer et al. | 137/844 |
| 5,895,315 | A | * | 4/1999 | Pinder, Jr. | 451/60 |
| 5,957,759 | A | * | 9/1999 | Cardenas et al. | 451/60 |
| 6,107,203 | A | * | 8/2000 | Vanell | 438/692 |
| 6,378,559 | B1 | * | 4/2002 | Humphryson | 137/849 |
| 6,425,804 | B1 | * | 7/2002 | Pettit et al. | 451/38 |
| 6,453,941 | B1 | * | 9/2002 | Milhas et al. | 137/515 |
| 6,551,174 | B1 | * | 4/2003 | Brown et al. | 451/41 |
| 6,585,005 | B1 | * | 7/2003 | Raftis et al. | 137/850 |

FOREIGN PATENT DOCUMENTS

| | | | |
|---|---|---|---|
| JP | 10193257 A | * | 7/1998 |
| JP | 11253893 A | * | 9/1999 |

* cited by examiner

*Primary Examiner*—Ramesh Krishnamurthy
(74) *Attorney, Agent, or Firm*—Laurence A. Greenberg; Werner H. Stemer; Ralph E. Locher

(57) ABSTRACT

A valve for a slurry outlet opening in an installation for chemical mechanical polishing, in particular of semiconductor wafers in DRAM production, includes an elastic diaphragm, which covers the slurry outlet opening and has at least one self-closing opening. It is possible for the opening to be moved into a feedthrough position for the slurry by flowing slurry and to be automatically moved into a blocking position for the slurry when the slurry is not flowing. A CMP installation having such a valve is also provided. This creates a simple way of preventing particle agglomerations in the region of the fluid outlet opening of a CMP installation.

18 Claims, 2 Drawing Sheets

VALVE FOR A SLURRY OUTLET OPENING OF A CHEMICAL MECHANICAL POLISHING DEVICE AND CHEMICAL MECHANICAL POLISHING DEVICE HAVING A VALVE

BACKGROUND OF THE INVENTION

Field of the Invention

The invention relates to a valve for a slurry outlet opening in an installation for chemical mechanical polishing, in particular of semiconductor wafers in DRAM production. The invention also relates to a chemical mechanical polishing device having a valve.

Chemical mechanical polishing (CMP) of semiconductor wafers is used for the fabrication of integrated circuits. The role of the CMP is to polish or grind down semiconductor wafers in order to obtain a highly planar, scratch-free and contamination-free surface.

CMP uses an aqueous suspension (slurry) which, during polishing, is introduced between a polishing device (e.g. a rotating surface of a soft, porous plastic cloth, known as a polishing pad) and the semiconductor wafer.

The slurry is a suspension which contains abrasive particles (having a size of approximately 100 nm). The abrasive particles are formed, for example, of silicon oxide, aluminum oxide or cerium oxide.

This slurry is generally applied to the polishing device from above through an outlet opening, with the quantity of slurry being matched to the particular process step through the use of a pump. In the known installation, the slurry-outlet opening is an open end of a pipe or a hole.

If the flow of slurry is stopped, the slurry dries-on in the region of the outlet opening, and agglomerations of the small silicon, aluminum or cerium oxide particles are formed. This formation is comparable to the formation of stalactites in nature, since the agglomerations of slurry initially adhere to and grow on the outlet opening. Ultimately, however, the agglomeration of slurry drops onto the polishing device.

If those aglomerated particles reach the surface of the semiconductor wafer during polishing, scratches are formed on the surface which has just been polished. Such scratches either require expensive remachining or make the semiconductor wafer unusable.

In known CMP installations the outlet opening is rinsed with water or slurry before a following polishing step in order to avoid agglomerations. Since those rinsing operations have to take place at regular intervals, considerable quantities of rinsing liquid are consumed, which is uneconomical. In addition, those rinsing operations take up time, which increases the total process time.

SUMMARY OF THE INVENTION

It is accordingly an object of the invention to provide a valve for a slurry outlet opening of a chemical mechanical polishing device and a chemical mechanical polishing device having a valve, which overcome the hereinafore-mentioned disadvantages of the heretofore-known devices of this general type and which provide a simple way of preventing particle agglomerations in a region of the slurry outlet opening of a CMP installation.

With the foregoing and other objects in view there is provided, in accordance with the invention, a valve for a slurry outlet opening in an installation for chemical mechanical polishing, in particular of semiconductor wafers in DRAM production. The valve comprises an elastic diaphragm covering the slurry outlet opening and having at least one self-closing opening. The at least one self-closing opening can be moved by flowing slurry into a feedthrough position for the slurry and can be automatically moved into a blocking position for the slurry when the slurry is not flowing.

Covering the slurry outlet opening by an elastic diaphragm with at least one self-closing opening prevents agglomeration of slurry particles. As mentioned above, the opening in the diaphragm is moved into the feedthrough position for the slurry by flowing slurry and, when slurry is not flowing, is automatically closed. Therefore, after the flow of slurry has stopped, the slurry is prevented from drying-on, since the outlet opening is closed off from the space outside.

In accordance with another feature of the invention, the diaphragm has a curvature, which is disposed counter to the direction of flow of the slurry, in the region of at least one opening. As a result, the static pressure of the slurry results in additional sealing of the opening in the region of the curvature.

In accordance with a further feature of the invention, in order to provide controlled influencing of the elasticity, the thickness of the diaphragm increases or decreases from the region of at least one opening in the center of the diaphragm to the edge of the diaphragm. If the diaphragm is thinner in the region of the opening, less deformation work is required to reach the feedthrough position. If the diaphragm is thicker in the region of the opening, the deformation work becomes greater. This allows the valve to be adapted to different structural conditions.

In accordance with an added feature of the invention, for the same reason, at least one strengthening device is disposed on and/or in the diaphragm. It is particularly advantageous if the at least one strengthening device runs from the center of the diaphragm to the edge of the diaphragm.

In accordance with an additional feature of the invention, at least one of the self-closing openings is constructed as a straight slot in a round diaphragm. An opening of this type is particularly easy to produce.

In accordance with yet another feature of the invention, at least one of the self-closing openings is formed by at least two slots, which cross one another, in a round diaphragm. This configuration is also easy to produce, and the deformation work which is required is lower than in the case of a single slot.

In accordance with yet a further feature of the invention, the slots of the openings are disposed point-symmetrically with respect to one another in the center of the round diaphragm. This makes it possible to achieve a uniformly shaped jet of slurry. This advantage is also obtained if, in accordance with yet an added feature of the invention, the at least three slots of the opening are disposed in a star shape in the diaphragm.

In accordance with yet an additional feature of the invention, the diaphragm is formed of plastic, in particular a fluorocarbon elastomer, such as FPM (vinylidene fluoride/hexafluoropropylene rubber) or FSI (fluorine-containing methyl silicone rubber). The use of a fluorocarbon elastomer instead of a hydrocarbon elastomer prevents longterm hydrophilization and also prevents the slurry from creeping on the plastic.

In accordance with again another feature of the invention, the valve is advantageously used in combination with a slurry which is a suspension of silicon, aluminum and/or cerium oxide particles.

With the objects of the invention in view, there is also provided a device for chemical mechanical polishing of semiconductor wafers, comprising a valve according to the invention.

Other features which are considered as characteristic for the invention are set forth in the appended claims.

Although the invention is illustrated and described herein as embodied in a valve for a slurry outlet opening of a chemical mechanical polishing device and a chemical mechanical polishing device having a valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
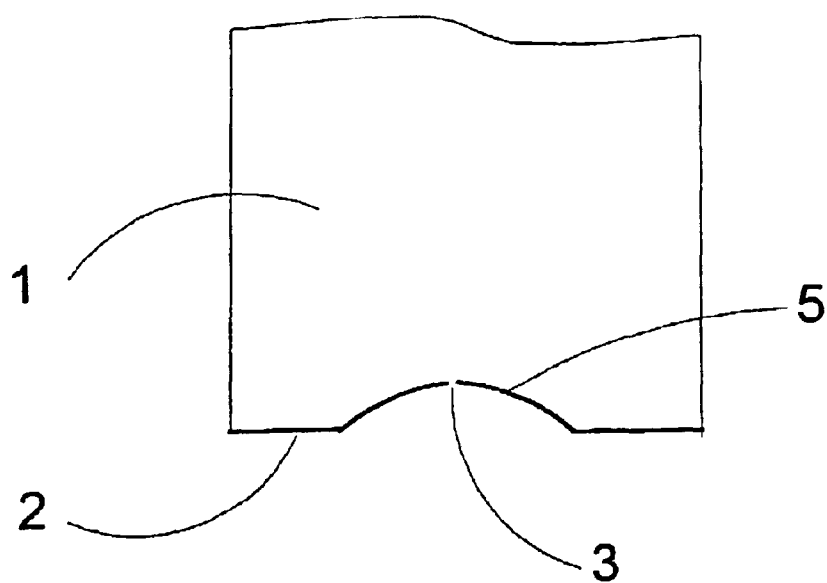
FIG. 1a is a diagrammatic, side-elevational view of a slurry outlet opening of a CMP installation with an embodiment of a valve according to the invention in a blocking position.
Figure 1B:
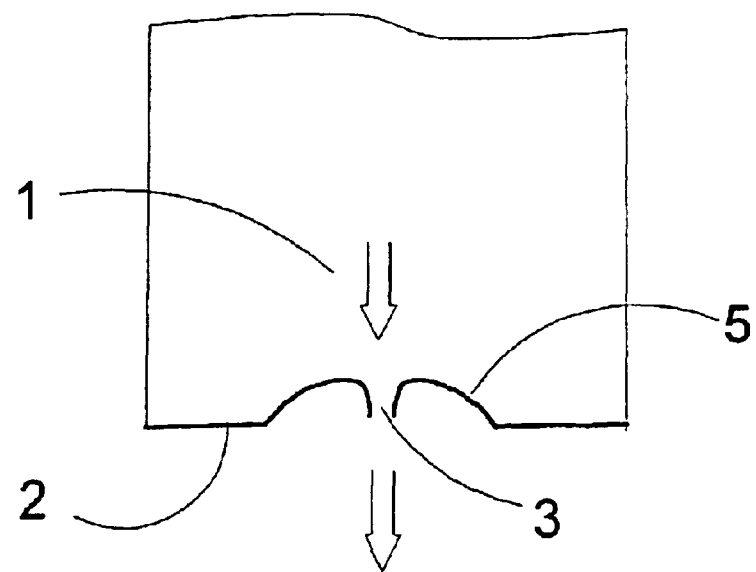
FIG. 1b is a diagrammatic, side-elevational view of a slurry outlet opening of a CMP installation with an embodiment of the valve according to the invention in a feedthrough position.

Referring now to the figures of the drawings in detail and first, particularly, to FIGS. 1a and 1b thereof, there are seen two operating states of an embodiment of a valve according to the invention. The valve covers a slurry outlet opening 1, which in FIGS. 1a and 1b is illustrated from the side. In this case, the slurry outlet opening 1 is formed as a simple end of a pipe. Alternatively, other cross sections or geometries are also conceivable. A direction of flow of the slurry runs from the top to the bottom in the drawing.

According to the invention, the valve has an elastic diaphragm 2 with a self-closing opening 3. In the exemplary embodiment illustrated herein, the opening 3 is a slot (see FIG. 2) in a curvature 5 of the diaphragm 2. The diaphragm is produced with this curvature 5 and the opening 3 and is connected to the slurry outlet opening 1 in such a way that the curvature 5 of the diaphragm 2 points in a direction opposite to the direction of flow of the slurry.

In the present context, the term self-closing means that the elasticity of the diaphragm 2 is such that it can generate a restoring force by virtue of its own elasticity without the need for any external energy to be supplied. In the present exemplary embodiment, this restoring force is used to move the opening 3 from a feedthrough position into a blocking position.

First of all, FIG. 1a shows the blocking position, which is present when no slurry is being delivered through the slurry outlet opening 1. The inherent elasticity of the diaphragm 2, assisted by the curvature 5 of the diaphragm, means that the slurry which is present above the diaphragm 2 cannot escape. Static pressure is insufficient to open the opening 3 in the curvature 5.

The opening 3 illustrated in FIG. 1a is larger than is the case in reality, in order to make the drawing clearer. In the blocking position, the edges of the opening 3 bear against one another in a sealing manner.

If slurry is then delivered by a non-illustrated pump, the valve is automatically moved out of the blocking position into the feedthrough position.

FIG. 1b illustrates how the pressure produced by the pump causes the elastic diaphragm 2 to be deformed in the direction of flow in the region of the opening 3. The slurry which escapes is symbolically indicated by two arrows.

If the pump is then stopped, no further delivery pressure acts on the slurry in the outlet opening 1, so that the diaphragm 2 returns to the blocking position shown in FIG. 1a in the region of the opening.

This prevents residues of slurry from drying onto a mouthpiece of the slurry outlet opening 1, and possibly also falling onto a polishing pad below, after the pump has been switched off.

In this case, the diaphragm is produced from a fluorocarbon elastomer, in order to prevent long-term hydrophilization. The properties of the fluorocarbon elastomer prevent the slurry from creeping, so that agglomeration is avoided.

The curvature 5 assists the self-closing action of the valve. Alternatively, given sufficient elasticity of the diaphragm 2, a single slot in a planar diaphragm 2 may also be sufficient to obtain a self-closing opening 3.

FIGS. 2 to 5 illustrate a number of possible structures for openings 3 in the diaphragm 2. For the sake of simplicity, the curvatures 5 are not illustrated in the diagrammatic plan views of the diaphragm 2. Additionally, the openings 3 are illustrated in the blocking position in each case.

Figure 2:
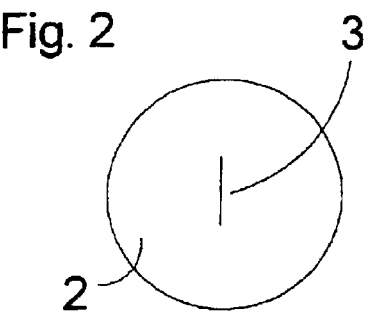
FIG. 2 is a diagrammatic, plan view of a diaphragm of an embodiment of the valve according to the invention with a slot as its opening.

In FIG. 2, the self-closing opening 3 is formed by a single slot. In the feedthrough position, the edges of the slot are pressed sideways and downward.

Figure 3:
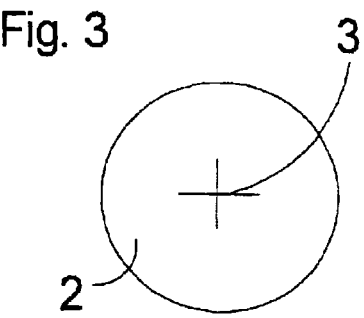
FIG. 3 is a diagrammatic, plan view of a diaphragm of an embodiment of the valve according to the invention with two slots perpendicular to one another as its opening.

In FIG. 3, two slots which are perpendicular to one another form the self-closing opening 3. In the feedthrough position, four corners formed by the slots are bent open. In this case, less deformation work needs to be applied to the diaphragm 2 than in the case of the single slot shown in FIG. 2.

Figure 4:
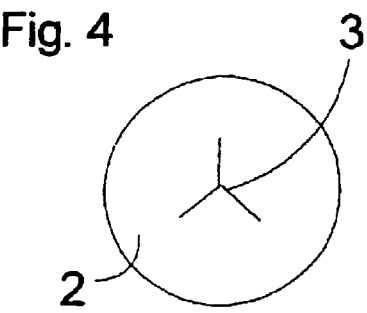
FIG. 4 is a diagrammatic, plan view of a diaphragm of an embodiment of the valve according to the invention with three slots disposed in a star shape as its opening.

In FIG. 4, three slots are disposed in a star shape, so that three corners, which are bent open in the feedthrough position, are formed.

Figure 5:
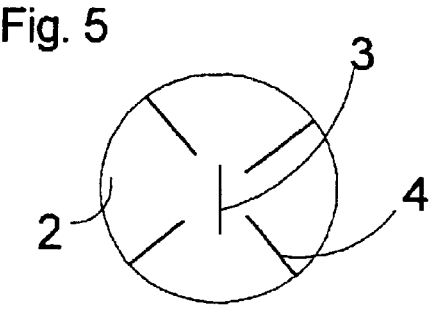
FIG. 5 is a diagrammatic, plan view of a diaphragm of an embodiment of the valve according to the invention with a slot as its opening and four devices for strengthening the diaphragm.

In FIG. 5, a single slot is used, in a similar manner to that shown in FIG. 2. In this case, there are additionally devices 4 for strengthening the diaphragm 2. In this case, these strengthening devices 4 are four rib-like reinforcements which are disposed radially on the diaphragm 2. Alternatively, the strengthening devices 4 may also be small, elastic rods of plastic which are disposed in the diaphragm.

These additional strengthening devices 4 allow the restoring force required for automatic closure of the opening 3 to be flexibly matched to the particular requirements.

Another alternative for varying the elasticity resides in making the thickness of the diaphragm 2 lower in the region of the openings than at the edge. This reduces the deformation work required. If a higher deformation work is to be achieved in the region of the opening 3, the thickness of the diaphragm is increased in this very region.

In principle, the strengthening devices 4 can also be used in combination with other configurations of openings, for example with those illustrated in FIGS. 2 to 4.

FIGS. 2 to 5 show circular diaphragms. However, alternative embodiments may also have other geometries, such as for example polygonal shapes of the diaphragm.

The construction of the invention is not restricted to the preferred exemplary embodiments which have been described above. Rather, a number of variants are possible, making use of the valve according to the invention and the chemical mechanical polishing device according to the invention, even with structures of a fundamentally different nature.

We claim:

1. A chemical mechanical polishing (CMP) installation, comprising:
   a slurry outlet opening; and
   a valve for said slurry outlet opening, said valve including:
   an elastic diaphragm covering the slurry outlet opening and having at least one self-closing opening, said at least one self-closing opening to be moved by flowing slurry into a feedthrough position for the slurry, and said at least one self-closing opening to be automatically moved into a blocking position for the slurry upon the slurry not flowing.

2. The CMP installation according to claim 1, wherein said diaphragm has a curvature disposed counter to a flow direction of the slurry, and said curvature is disposed in the region of said at least one self-closing opening.

3. The CMP installation according to claim 1, wherein said diaphragm has an edge, a center at which said at least one self-closing opening is disposed and a thickness increasing from the region of said at least one self-closing opening in said center to said edge.

4. The CMP installation according to claim 1, wherein said diaphragm has an edge, a center at which said at least one opening is disposed and a thickness decreasing from the region of said at least one opening in said center to said edge.

5. The CMP installation according to claim 1, which further comprises at least one strengthening device disposed on said diaphragm.

6. The CMP installation according to claim 1, which further comprises at least one strengthening device disposed in said diaphragm.

7. The CMP installation according to claim 1, which further comprises at least one strengthening device disposed on and in said diaphragm.

8. The CMP installation according to claim 5, wherein said diaphragm has an edge and a center, and said at least one strengthening device runs from said center to said edge.

9. The CMP installation according to claim 6, wherein said diaphragm has an edge and a center, and said at least one strengthening device runs from said center to said edge.

10. The CMP installation according to claim 7, wherein said diaphragm has an edge and a center, and said at least one strengthening device runs from said center to said edge.

11. The installation according to claim 1, wherein said diaphragm is round, and said at least one self-closing opening includes at least one self-closing opening being a straight slot in said round diaphragm.

12. The CMP installation according to claim 1, wherein said diaphragm is round, and said at least one self-closing opening includes at least one self-closing opening formed by at least two slots crossing on another in said round diaphragm.

13. The CMP installation according to claim 12, wherein said diaphragm has a center, and said slots of said at least one self-closing opening formed by at least two slots are disposed point-symmetrically with respect to one another in said center of said round diaphragm.

14. The CMP installation according to claim 1, wherein said at least one self-closing opening has at least three slots disposed in a star shape in said diaphragm.

15. The CMP installation according to claim 1, wherein said diaphragm is formed of plastic.

16. The CMP installation according to claim 1, wherein said diaphragm is formed of a fluorocarbon elastomer.

17. The CMP installation according to claim 16, wherein said fluorocarbon elastomer is selected from the group consisting of FPM (vinylidene fluoride-hexafluoropropylene rubber) and FSI (fluorine-containing methyl silicone rubber).

18. The CMP installation according to claim 1, wherein the slurry is a suspension including particles of a material selected from the group consisting of silicon oxide, aluminum oxide and cerium oxide.

* * * * *